United States Patent
Takahashi

(10) Patent No.: US 6,932,348 B2
(45) Date of Patent: Aug. 23, 2005

(54) MECHANICAL SEALING DEVICE

(75) Inventor: Hidekazu Takahashi, Sakado (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 10/229,217

(22) Filed: Aug. 28, 2002

(65) Prior Publication Data

US 2003/0042683 A1 Mar. 6, 2003

(30) Foreign Application Priority Data

Aug. 31, 2001 (JP) .......................................... 2001-263646

(51) Int. Cl.$^7$ .............................................. F16J 15/34
(52) U.S. Cl. ........................ 277/359; 277/360; 277/371; 277/408
(58) Field of Search ................ 277/358–360, 277/370–371, 390, 394, 408

(56) References Cited

U.S. PATENT DOCUMENTS

| | | | | |
|---|---|---|---|---|
| 3,075,780 A | * | 1/1963 | Mayer | 277/353 |
| 3,722,896 A | * | 3/1973 | Tankus | 277/395 |
| 4,082,297 A | * | 4/1978 | Adams | 277/348 |
| 5,062,777 A | * | 11/1991 | Carlsson | 418/104 |
| 5,238,253 A | * | 8/1993 | Sieghartner | 277/408 |
| 5,354,070 A | * | 10/1994 | Carmody | 277/370 |
| 5,489,105 A | * | 2/1996 | Attenasio et al. | 277/370 |
| 5,577,738 A | * | 11/1996 | Fukuda | 277/370 |
| 5,924,698 A | * | 7/1999 | Parkin | 277/370 |
| 5,938,205 A | * | 8/1999 | Azibert et al. | 277/361 |
| 6,428,011 B1 | * | 8/2002 | Oskouei | 277/358 |

* cited by examiner

Primary Examiner—Alison Pickard
Assistant Examiner—Vishal Patel
(74) Attorney, Agent, or Firm—Arent Fox PLLC

(57) ABSTRACT

Even high viscosity fluid or slurry-contained fluid can be securely sealed without deficiency of a liquid sealing device. The sealing liquid device includes an annular packing made of rubber-like elastic material, the annular packing having a secured section fitted with fluid tight to one retaining surface between the first stationary seal ring and the seal flange and having a seal lip section fitting to the other contact face for sealing.

5 Claims, 6 Drawing Sheets

MECHANICAL SEALING DEVICE

BACKGROUND OF THE INVENTION

1. Field of the Invention

This invention relates to a mechanical sealing device and particularly to the technical field of a cartridge type mechanical sealing device adapted to seal high viscosity fluid or slurry contained fluid and prevent solid matters contained in the fluid to be sealed from sticking on the components and clogging between the components.

2. Description of the Related Art

There has been, as a related art, U.S. Pat. No. 4,290,611. FIG. 5 is a half sectional view of the mechanical seal shown in FIG. 4 of U.S. Pat. No. 4,290,611.

In FIG. 5, the reference numeral 100 denotes a mechanical seal. The mechanical seal 100 is comprised of a pair of primary components so as to be attached to a rotary shaft 151 and then installed within a stuffing box 150 through fastening bolts 160. The mechanical seal 100 includes, as the primary components thereof, a liquid sealing device 101, a fist seal flange 110, a second seal flange 120 and a gas sealing device 121 that are arranged in order, from the inside of the stuffing box 150 toward the outside thereof, in the axial direction.

The liquid sealing device 101 is mounted on the outer circumference of a sleeve 153 secured onto the rotary shaft 151 through a screw socket 152. Between the rotary shaft 151 and the sleeve 153 fitting thereto is disposed an O-ring 154 for sealing therebetween.

In the liquid sealing device 101, a rotary seal ring 102 formed with a rotary seal face 103 is resiliently biased by a spring 105 through a U-shaped gasket 107 and a spacer 108.

Also, a stationary seal ring 112 having a stationary seal face 113 in contact with the rotary seal face 103 is fitted to the inner circumference of the first seal flange 110 through an O-ring 116. Further, at least one pin 115 secured to the stationary seal ring 112 engages a groove provided in the inner circumference of the first seal flange 110 to engage the stationary seal ring 112 with the first seal flange 110.

A gas-sealing device 121 is installed inside of the inner circumference of the second seal flange 120 coupled with the first seal flange 110. The gas-sealing device 121 is provided with a drive sleeve 125 that is secured to the sleeve 153 through at setscrew 126. A second rotary seal ring 122 having a second rotary seal face 123 is fitted in the drive sleeve 125 to slide therein. One end of a fluid passage formed in the second rotary seal ring 122 for creating dynamic pressure is opened at the second rotary seal face 123.

A second stationary seal ring 132 having a second stationary seal face 133 in close contact with the second rotary seal face 123 of the second rotary seal ring 122 is fitted to the inner circumference of the second seal flange 120 through an O-ring 136. In the second stationary seal face 133 are formed a plurality of grooves for creating dynamic pressure, in cooperation with the second rotary seal face 123. Also, the second rotary seal ring 122 is resiliently biased by a coil spring 127 toward the second stationary seal ring 132 side.

The second seal flange 120 is provided with a drain tap 128 for draining liquid that leaked from the liquid sealing device 101. Also, in the stuffing box 150 is provided a flushing port 158 for washing the liquid sealing device 101 using liquid ejected therefrom.

The mechanical seal 100 is assembled to the rotary shaft 151 and then the assembly is inserted and installed inside of inner circumferential surface 156 of the stuffing box 150.

The mechanical seal 100 constituted as described is installed, through the sleeve 153, in a space 157 that is formed between the outer circumferential surface of the rotary shaft 151 and the inner circumferential surface 156 of the stuffing box 150. The space 157 is required of a size enough to contain the sleeve 153 and the liquid sealing device 101. However, the increase of the diameter of the inner surface 156 of the stuffing box 150 is often limited due to structural conditions. Accordingly, the gap formed between the inner surface 156 of the stuffing box 150 and the liquid sealing device 101 will be small, which causes the flow of the sealed fluid to be worsened. The rotary seal face 103 and the stationary seal face 113 heated by sliding heat generation cannot be satisfactorily cooled. This causes the seal faces to be damaged.

Additionally, it is difficult to wash the liquid sealing device 101 when a washing liquid is flushed through the flushing port 158.

If the fluid to be sealed is viscosity fluid or slurry contained fluid, slurries contained in the fluid are apt to clog between the liquid sealing device 101 and the inner surface 156 of the stuffing box 150. This causes the cooling effect on both seal faces 103, 113 as well as the sealing ability thereof to worsen, resulting in sealed fluid leakages between the seal faces 103, 113.

Furthermore, there are such problems that erosion or rust occurred in the spring 105 due to direct contact of the spring 105 with the sealed fluid reduces the elasticity thereof and adhesion of the sealed fluid slurry onto the spring 105 causes the operation of the spring 105 to push the rotary seal ring 102 to be deficient. Additionally, since slurries stick between the sliding faces of the rotary seal ring 102 and the sleeve 153 or between the sliding faces of the spacer 108 and the sleeve 153, and then bite into them, the response of the rotary seal ring 102 to the surface pressure is worsened to cause the sealing ability to be reduced.

As has been described, in order to prevent the reduction of the sealing ability of the liquid sealing device 101 it is required to arrange a bilateral sealing device. As a result, the structure becomes complicated and higher accuracy for assembly is required. The complicated structure for the liquid sealing device 101 makes difficult to cool the rotary seal ring 102 and the stationary seal ring 112 and induces thermal deformation of the seal faces 103, 113. As a result, the sealing ability is worsened and the seal surfaces are damaged.

This invention is achieved in view of such problems as described previously, the technical problem to be solved by the invention is to provide a liquid sealing device that is arranged to be mounted outside of the stuffing box and the rotary shaft regardless of the structure of the stuffing box, for allowing the seal faces of the stationary and rotary seal rings sliding each other to be cooled and for preventing slurries in the sealed fluid or high viscosity fluid from sticking to cause the response to be deficient.

Another technical problem to be solved is to easily wash off slurries contained in the sealed fluid or high viscosity fluid that sticks in the liquid sealing device and solidifies, especially wash the sliding faces of the seal rings at any time for maintaining good response of the seal rings to the surface pressure.

A further technical problem to be solved is to provide a sealing device that is arranged to be mounted outside of the stuffing box and the rotary shaft regardless of the structure of the stuffing box, for allowing the distance between the opposing faces of the stationary and rotary seal rings to be enough to avoid any inverse affects from the slurry contained fluid and high viscosity fluid.

A further yet technical problem to be solved is to provide a sealing device having a structure so that fixing pins or the like for preventing the rotation of the seal rings and springs that bias the seal rings are not inversely affected by the sealed fluid.

SUMMARY OF THE INVENTION

This invention is made to solve the technical problems above and therefore the technical means for solving them are constituted as follows:

The mechanical seal as the first embodiment according to the invention is one installed externally of a shaft and a device body through which the shaft passes, comprising: an attachment member being attached to the external face of the device body and having an inner face fitted to the shaft and a flushing port opened at the inner face; a first seal ring being movably fitted to the inner face of the attachment member, being biased by a resilient means and having a seal face at its outer end; a second seal ring having a relative seal face in close contact with the seal face of the first seal ring; and a seal collar being secured to the shaft and retaining with fluid tight the second seal ring; wherein, between the first seal ring and the shaft the first seal ring has a gap through which the sealed fluid passes; and the flushing port is in communication with the proximity of the radially inner side of the seal face.

In the mechanical seal according to the first embodiment of the invention, between the first seal ring and the shaft the first seal ring has a gap having a size enough for the sealed fluid to pass through, and the flushing port is in communication with the proximity of the radially inner side of the seal face. Accordingly, for the first seal ring biased by the resilient means, its all surfaces that contact the sealed fluid are washed by the fluid injected through the flushing port. Therefore, slurries in the sealed fluid and high viscosity fluid sticking on the first seal ring will not solidify thereon. In other words, since the sliding movement of the first seal ring is not blocked by such solid matters, the response to the surface pressure of the seal face can be exerted and the sealing effect be improved.

Also, since the mechanical sealing device is installed within the attachment member that is installed externally to the device body, it is allowed to design the gap between the first ring seal and the shaft to be fully long. Accordingly, the sealed fluid can flow smoothly within the first seal ring. Further, high viscosity fluid or slurries are blocked to stick and solidify on the first seal ring, resulting in improvement of response of the first seal ring and exertion of sealing ability.

The mechanical seal as the second embodiment according to the invention is one installed externally of a shaft and a device body through which the shaft passes, comprising: an attachment member being attached to the external face of the device body and having an inner face fitted to the shaft; a first seal ring being movably fitted to the inner face of the attachment member, being biased by a resilient means and having a seal face at its outer end; a second seal ring having a relative seal face in close contact with the seal face of the first seal ring; and a seal collar being secured to the shaft and retaining with fluid tight the second seal ring; wherein the attachment member includes an annular cooling passage formed to cover circumferentially over the seal face of the first seal ring fitting to the inner surface of the attachment member; a throttling face outward of the annular cooling groove is fitted with a play to the outer circumferential surface of the second seal ring; and the attachment member also includes a coolant passage in communication with the annular cooling groove.

In the mechanical seal according to the second embodiment of the invention, the attachment member includes an annular cooling passage formed to cover circumferentially over the seal face of the first seal ring fitting to the inner surface of the attachment member, a throttling face outward of the annular cooling groove is fitted with a play to the outer circumferential surface of the second seal ring, and the attachment member also includes a coolant passage in communication with the annular cooling groove. Accordingly, the raised temperature can be lowered by supplying a large volume of fresh water to directly cool the proximity of the seal faces heated with heat generation from relative sliding of the first and the second seal rings. It is therefore allowed that if both seal faces sliding each other are subject to sliding heat generation, they are effectively cooled to prevent from being damaged due to deformation thereof.

DETAILED DESCRIPTION OF THE INVENTION

Now, mechanical sealing devices 1 as preferred embodiments of the invention are hereinafter described in detail, referring to the accompanying drawings, which are design drawings.

Figure 1:
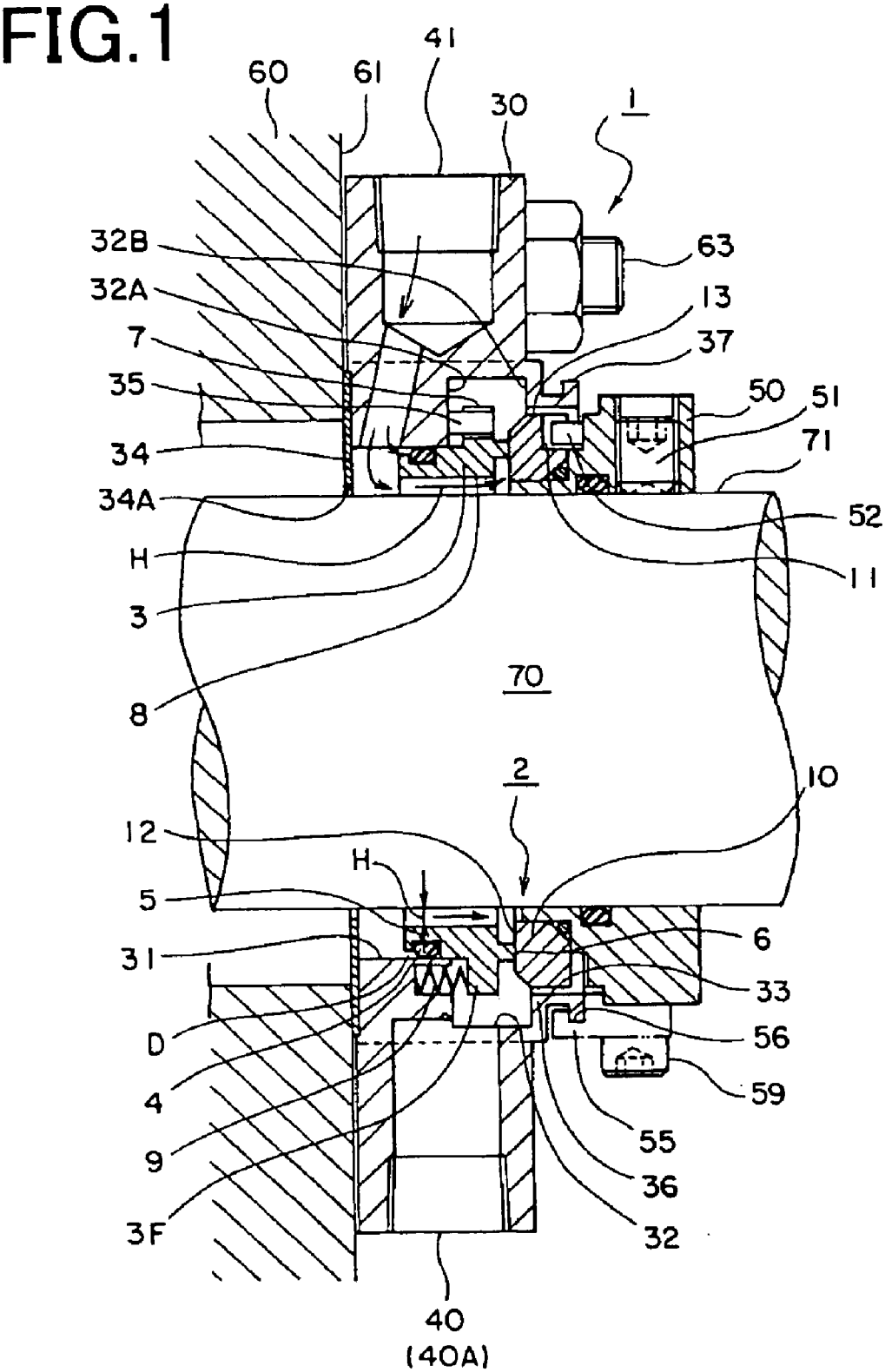
FIG. 1 is a sectional view, showing a mechanical sealing device that is installed to a shaft, as the first preferred embodiment according to the invention.

FIG. 1 shows a mechanical sealing device 1 as the first preferred embodiment according to the invention. The mechanical sealing device 1 as a cartridge is installed on the device body (stuffing box) 60 and the external face of the rotary shaft 70.

Figure 2:
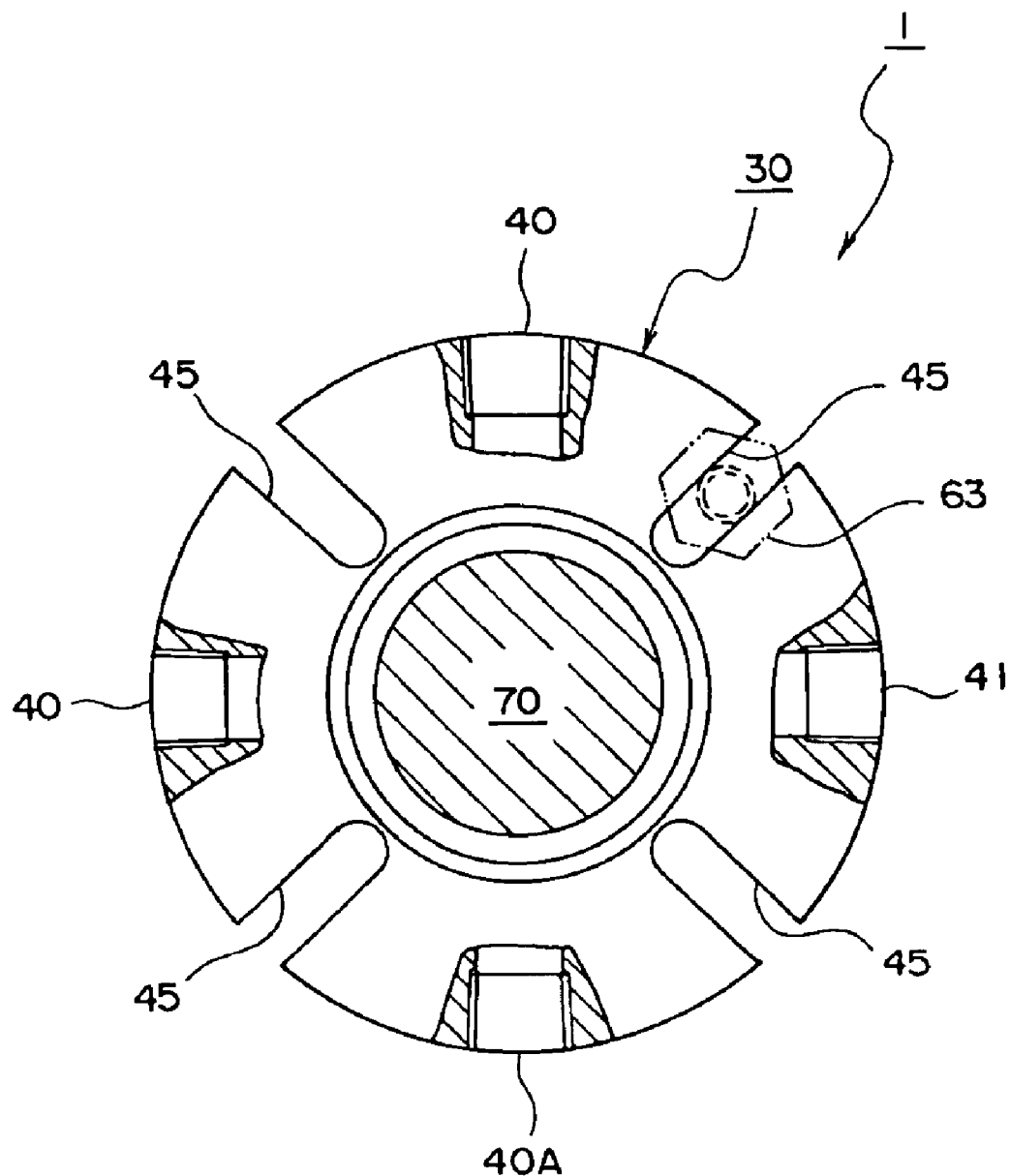
FIG. 2 is a plan view in the axial direction, showing the mechanical sealing device in FIG. 1.

FIG. 2 shows the mechanical sealing device 1 fitted to the rotary shaft 70 in FIG. 1 as seen in the axial direction.

The mechanical sealing device 1 in FIG. 1 is installed by positioning a seal flange 30 that is fixed to the external face 61 of the device body 60 and a seal collar 50 to be fixedly fitted to the rotary shaft 70, using set plates 55.

The seal flange (attachment component) 30 to be mounted to the device body 60 is, as shown in FIG. 2, configured to be an annular disk and has four fixing grooves 45 arranged along the circumference with equal spacing to each other. The seal flange 30 is attached to the device body 60 through the fixing grooves 45 with bolts 63.

The inner circumferential surface of the seal flange 30 defines a fitting surface 31, an annular cooling groove 32 and a throttling face 33.

The seal flange 30 is provided with two or three quenching liquid passages 40 arranged to be equally spaced along the outer circumferential surface, a flushing port 41, and quenching liquid drain ports 40A on the same circumferential surface. Each of the fluid passages 40 is formed so as to communicate with the annular cooling groove 32 in the inner circumferential surface, through a pipe thread portion for connecting an external piping. And quenching liquid (fluid) is supplied directly to the seal faces 6, 12 through the quenching liquid passages 40, cools the seal faces 6, 12 heated by sliding heat generation.

The flushing port 41 is formed so as to pass through the pipe thread portion connecting to an external piping and open at the fitting surface 31 of the inner circumferential surface. The surfaces of the stationary seal ring (first seal ring) 3 or others that the sealed fluid contacts are washed by supplying fresh water intermittently.

The drain ports 40A are used to drain the fluid supplied through the quenching liquid passages 40.

To the fitting face 31 of the seal flange 30 is fitted the stationary seal ring 3 movably in the axial direction. The stationary seal ring 3 is formed with an attachment groove 4 for an O-ring that seals between the stationary seal ring and the fitting surface 31. This attachment groove 4 is one for an embodiment in which the spacing D between the fitting surface 31 and one end face of the stationary seal ring 3 on one side of the groove is made large. Of course, other embodiments in which the spacing D is made small have been employed.

In the attachment groove 4 is fitted the O-ring (third seal ring) 5. The O-ring 5 is made of material, such as fluoro rubber, nitrile rubber, EPDM and perfluoro elastomer.

Further, the stationary seal ring 3 has a seal face 6 formed at its end face opposing the attachment groove 4. A flange section 3F is formed on the circumference side of the stationary seal ring 3. Guide grooves 7 are formed in the flange section 3F. Each of the guide grooves 7 engages a fixing pin 35 fixedly fitted in a bore opened at the side face of an annular cooling groove 32. The fixing pins 35 and the guide grooves 7 are relatively movable in the axial direction, but engaged with each other in the circumferential direction.

The seal flange section 3F is provided with circumferentially a plurality of spring seats on which coil springs 9 equally spaced each other seat for biasing the stationary seal ring 3.

The inner circumferential surface 8 of the stationary seal ring 3 is formed such that the spacing H between the surface 8 and the outer circumferential surface of 71 of the rotary shaft 70 is widened for the sealed fluid to flow through it without solidification of the sealed fluid to clog. The stationary ring seal 3 is made of material, such as silicone carbide, carbon and ceramics.

A rotary seal ring (second seal ring) 10 as the other component that constitutes the liquid sealing device 2 is fitted to a seal collar 50 that is fixedly fitted to the rotary shaft 70.

The seal collar 50 is fixedly fitted with fluid tight to the rotary shaft 70 through an O-ring and secured with a set screw 51. The inner circumferential surface of the rotary seal ring 10 is fitted with fluid tight to the fitting face of the seal collar 50 through an O-ring. The rotary seal ring 10 engages, in drive fit, the seal collar 50 in such a manner that recesses formed in the side face of the rotary seal ring 10 engages fixing pins 52 fixedly fit to the bores formed in the seal collar 50.

The rotary seal ring 10 has, at one end, a relative seal face 12. The seal face 12 contacts with fluid tight the seal face 6 of the stationary seal ring 3. The outer circumferential surface of the rotary seal ring 10 defines outer circumferential seal face 13 that is in close contact with a throttling face 33 of the seal flange 30 to seal the fluid injected through the quenching fluid passages 40. The throttling face 33 and the outer circumferential seal surface 13 exert sealing action to seal the fluid. The rotary ring seal 10 is made of material, such as silicone carbide, carbon and ceramics.

The seal flange 30 is provided with a gasket 34 between the device body 60 and the seal flange 30. The inner circumferential surface 34A of the gasket is closely fitted to the rotary shaft 70. The gasket is made of a material, such as resin and metal. Fresh water ejected through the flushing port 41 strikes the gasket and washes the attachment grove 4 and the O-ring 5. Further, the fresh water passes through the spacing H for washing off solid matters sticking on the surfaces forming the spacing H, while at the same time, washing the radially inner face of the seal face 6 and preventing foreign matters from entering between the seal faces 6, 12.

In the seal flange 30, the annular cooling groove 32 is formed to have an axially large volume relative to the seal face 6. On side face 32A of the annular cooling groove 32 is formed near the attachment groove 4 of the stationary seal ring 3 and the other side face 32B is formed near the mid-way of the rotary seal ring 10. The quenching liquid ejected through the quenching liquid passages 40 is adapted to be directly ejected toward the seal face 6. Also, since the annular cooling groove 32 formed in large size for covering over the stationary seal ring 3 and the rotary seal ring 10, the cooling effect with such volume of the annular cooling groove 32 is effective when heat generation occurred by frictional sliding movement of the seal faces 3, 10.

A cylindrical section 36 is formed to extend on the atmospheric airside, compare to the annular cooling groove 32. The inner surface of the cylindrical section 36 defines the throttling face 33. The throttle face 33 comes very close to the outer circumferential seal face 13 of the rotary seal ring 10 to constitute a throttling sealing section. At the end of the cylindrical section 36 is formed a flange constituting a positioning section 37.

The flushing port 41 formed in the seal flange 30 passes through near the attachment groove 4 formed in the stationary seal ring 3. Fresh water ejected through the flushing port 41 effectively washes off solid matters sticking to the attachment groove and the O-ring. Especially for the attachment groove 4, slurries or high viscosity fluid entering the attachment groove 4 can be easily removed because it has the spacing D on the flushing port 41 side.

The seal flange 30 and the seal collar 50 as constituted above are positioned by the set plates 55 to be mounted. Each of the set plates 55 has a sectional shape as shown by a phantom line and they are placed circumferentially to be equally spaced on the side face of the seal flange 30 and secured with bolts 59. Engagement grooves 56 are engaged with positioning section 37 of the seal collar 50 to position the seal collar 50 and the seal flange 30 to be located.

Figure 3:
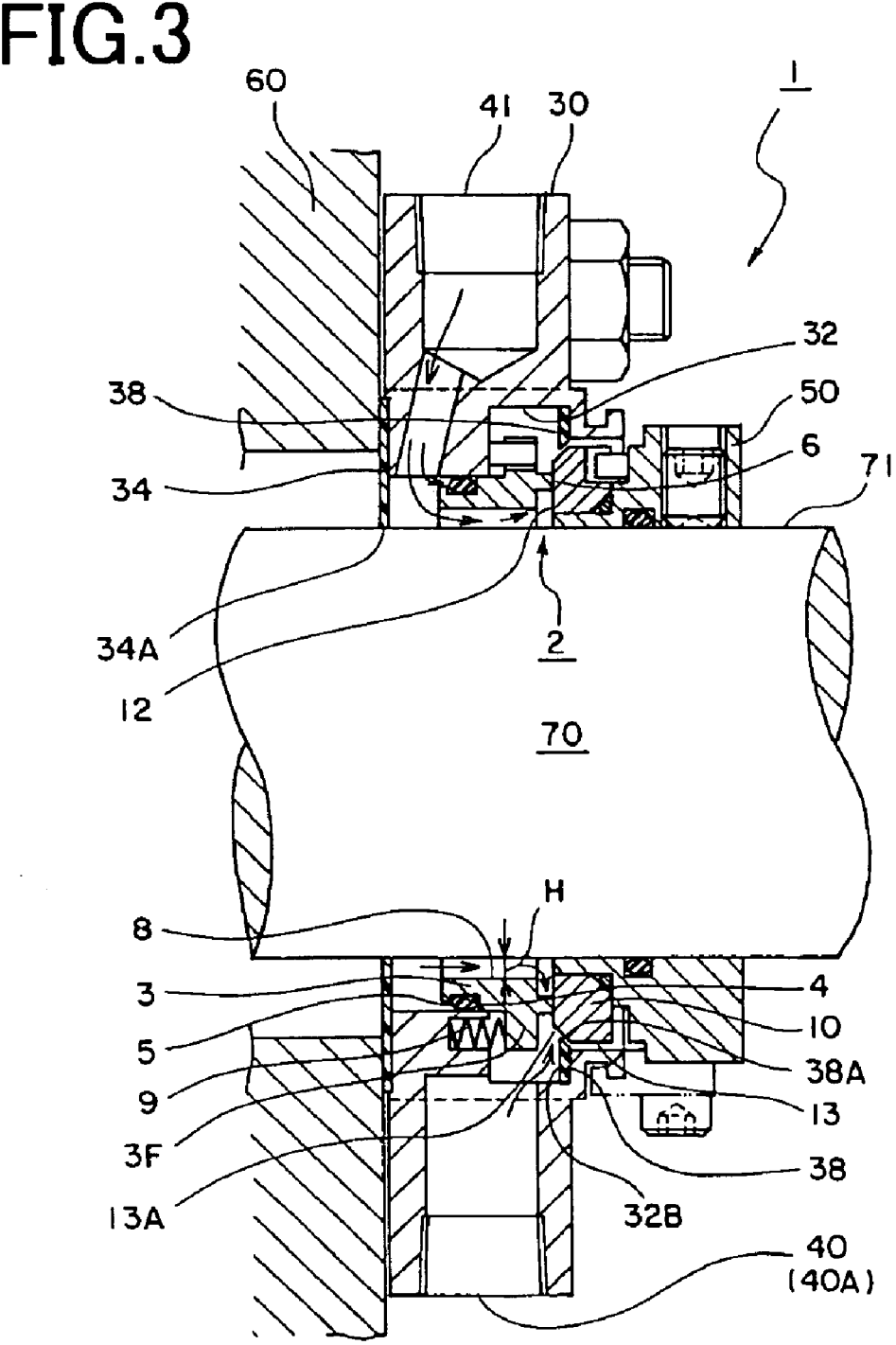
FIG. 3 is a sectional view, showing a mechanical sealing device that is installed to a shaft, as the second preferred embodiment according to the invention.

FIG. 3 shows a mechanical sealing device as the second preferred embodiment according to the invention.

The configuration of the mechanical sealing device 1 in FIG. 3 is approximately same to that of the mechanical sealing device 1 as shown in FIG. 1. The difference is that the gasket 34 is made of resin material.

The inner circumferential surface 34A of the gasket 34 is fitted to the outer circumferential surface 71 of the rotary shaft 70 to seal.

Accordingly, the fresh water ejected continuously of intermittently through the flushing port 41 securely washes the attachment groove 4 and the O-ring 5 aw well as the spacing H and the inside of the seal face 6 while cooling them. The seal face 6 heated by sliding heat generation is cooled, while washed. Also, the response of the stationary seal ring 3 is improved because good sliding ability is given to the stationary seal ring 3 subject to such washing.

Also, in the seal flange 30, a disk-like seal lip 38 made of rubber material is disposed to the other side face 32B of the annular cooling groove 32. The inner circumferential surface 38A of the seal lip 38 comes very close to or closely contacts the outer circumferential seal surface 13 (when the inclined surface 13A is short in the length of one side) or the inclined surface 13A. The seal lip 38 securely seals the inside of the annular cooling groove 32 to be cooled. The water exits a drain hole 41A (not shown) formed in the lower portion of the annular cooling passage 32.

Figure 4:
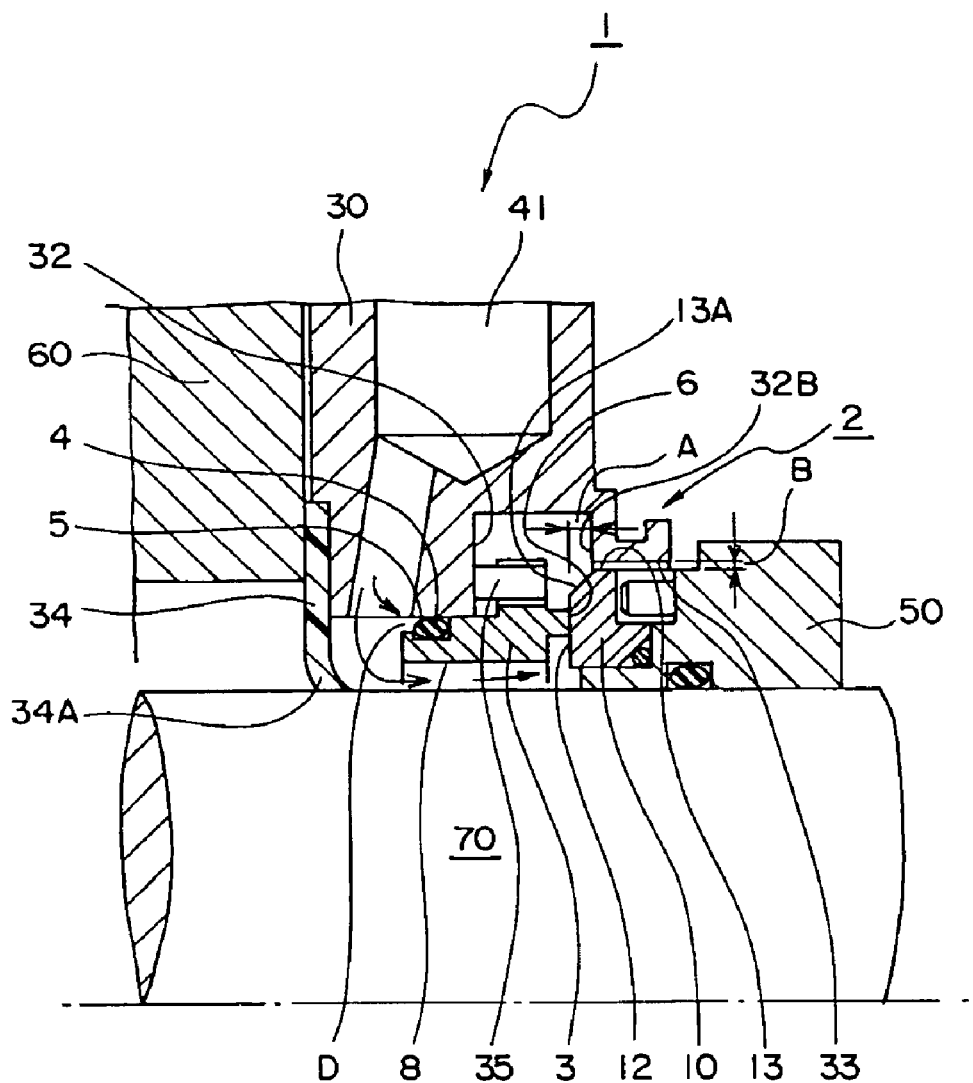
FIG. 4 is a half sectional view, showing a mechanical sealing device that is installed to a shaft, as the third preferred embodiment according to the invention.
Figure 5:
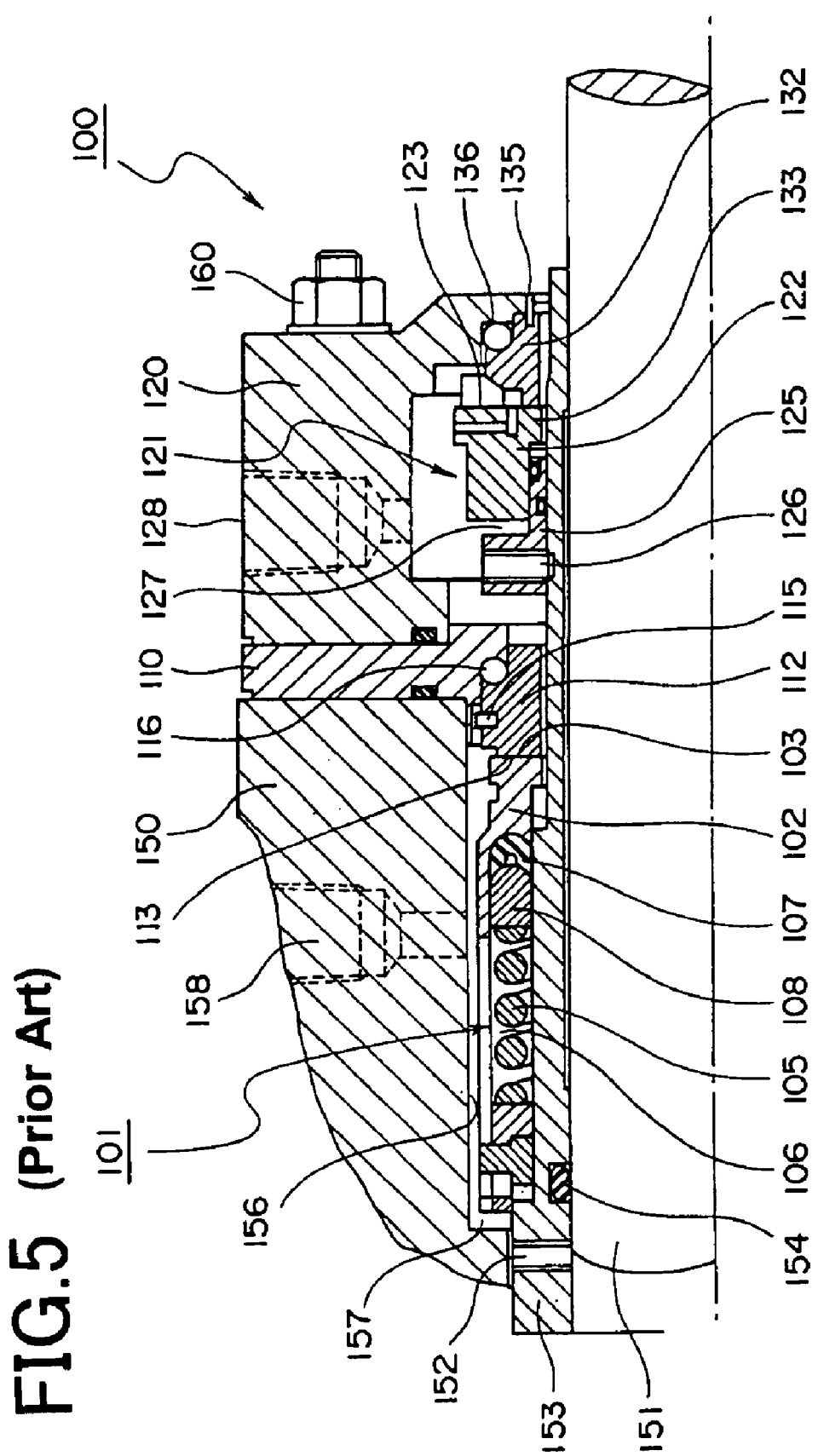
FIG. 5 is a half sectional view, showing a comparative example of a mechanical seal.
Figure 6:
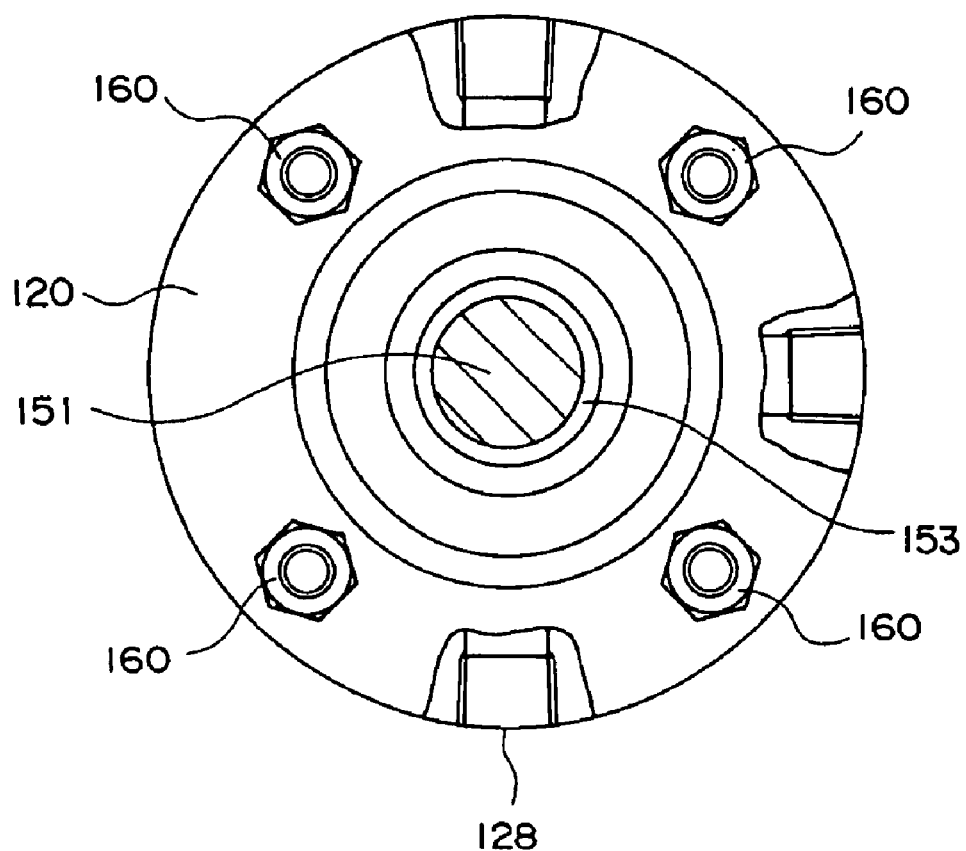
FIG. 6 is a plan view in the axial direction of FIG. 5.

FIG. 4 shows a mechanical sealing device 1 as the third preferred embodiment according to the invention.

The configuration of the mechanical sealing device 1 in FIG. 4 is approximately same to that of the mechanical sealing device 1 as shown in FIG. 1. The difference is that the gasket 34 made of rubber material is formed with a seal lip on its inner circumference 34A side. The gasket 34 as a boundary isolates the stationary seal ring 3 side and the opposing side thereof. In the stationary seal ring 3 side, fresh water ejected through the flushing port 41 generates turbulence flow to fully wash and the stationary seal ring 3 and the rotary seal ring 10 are fully cooled. Therefore, heat generation during the seal face 6 and the relative seal face 12 slide relatively can be reduced and any damage on the seal faces 6, 12 involved in heat generation is effectively prevented.

Also, since the flushing port 41 is constituted to be opened, on the fitting surface 31 side, into the spacing D to directly communicate with the attachment groove 4, solid matters are securely washed off. This causes the sliding resistance between the stationary seal ring 3 and the fitting surface 31 to be reduced. As a result, the response of the stationary seal ring 3 to the surface pressure of the seal face is improved as well as sealing ability.

Further, the other side face 32B of the annular cooling groove 32 that is formed on the seal flange 30 is formed to extend by a length A from the seal face 6 toward the rotary seal ring 10 side. The length A may be up to approximately a half of the length of the rotary seal ring 10 in the axial direction. Further, the rotary seal ring 10 may be provided with an inclined surface 13A having a side of A in its horizontal length A.

Additionally, the throttling gap B formed between the outer circumferential seal surface 13 of the rotary seal ring 10 and the throttling face 33 may be other than zero, in other words, may be designed nearly to zero as far as possible.

In the mechanical sealing device 1 as constituted above, the spacing D and the gap H can be enlarged since any sleeves of the related arts described previously are not required. Accordingly, slurry contained fluid or high viscosity fluid sticking to the stationary seal ring 3 and others can be rinsed and washed off securely. It is also allowed to prevent solid matters of high viscosity sealed fluids from clogging and securely cool the sliding faces of the stationary seal ring 3 and the rotary seal ring 10 that are heated by sliding heat generation.

Further yet, since the fixing pin 35, 52 and the spring 9 that biases the stationary seal ring 3 are positioned on the atmospheric air side where they do not contact the sealed fluid, it is able to prevent from being rusted and eroded.

Next, the constitution and effect of each of the further embodiments according to the invention is described hereinafter:

In the mechanical sealing device 1 as the first embodiment according to the invention, it is preferred that the mechanical sealing device 1 further comprises an attachment groove 4 formed between the first seal ring 3 and the inner face 8 of the attachment member 30 fitting thereto and a third seal ring 5 provided in the attachment groove 4 and the flushing port 41 is opened at the inner surface, close to the attachment groove 4.

Since this mechanical sealing device further comprises an attachment groove formed between the first seal ring and the inner face of the attachment member fitting thereto and the flushing port is opened at the inner surface, close to the attachment groove, it is expected to prevent from worsening the operation of the first seal ring due to adhesion of slurries or the like between the seal ring and the attachment groove as well as improve the response of the first seal ring to the surface pressure.

In the mechanical sealing device 1 as the first embodiment according to the invention, it is preferred that the mechanical sealing device 1 further comprises an annular blocking gasket 34 that is retained with fluid tight by the attachment member 30 on the side opposing the attachment groove 4 and fitted with fluid tight or with a play, at the inner surface 8, to the shaft 70.

In this mechanical sealing device, fresh water is deflected when it is ejected through the flushing port, thereby enabling to wash the annular groove to which a seal ring is attached, the inner circumferential surface of the first seal ring, and the seal face side thereof and further enabling to effectively prevent the reduction of sealing ability due to adhesion and solidification of high viscosity fluid to the first seal ring, adhesion to clog the gap passage, and interference with the operation of the first seal ring.

In the mechanical sealing device 1 as the second embodiment according to the invention, it is preferred that the annular cooling groove 32 has such a size that one side face 32A of the annular cooling groove 32 is formed radially and outwardly at the axially inner midpoint of the first seal ring 3 spaced from the seal face as a center and the other side face 32B is formed radially and outwardly at the axially outer midpoint of the second seal ring 10.

In this mechanical sealing device, since the annular cooling groove is formed with the seal face as the center so as to cover over the whole outer circumferential surfaces of the first and second seal rings, those rings can be effectively cooled. Accordingly, the seal faces are protected from heat deformation, thereby to exert the sealing ability.

In the mechanical sealing device 1 as the second embodiment according to the invention, it is preferred that the resilient means 9 or the fixing pins 35, 52 of the seal rings are located on the atmospheric air side, as compared to the seal face 6.

In this mechanical sealing device, since the resilient means or the fixing pins of the first and second seal rings are located on the atmospheric air side, as compared to the seal face 6, so that they cannot contact the sealed fluid, it is expected to exert the function and then improve the sealing ability of the first and second seal rings without erosion and rust caused by the sealed fluid.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A mechanical seal installed externally of a shaft and a device body through which the shaft passes, comprising:

an attachment member detachably attached to an external face of the device body by a gasket disposed therebetween and having an inner face fitted to the shaft;

a first seal ring being axially movable relative to the shaft, and fitted to the inner face of the attachment member, the first seal being axially biased by a resilient means and having a seal face at an outer end;

a second seal ring having a relative seal face in close contact with the seal face of the first seal ring, wherein the first and second seal rings are disposed outside the external face of the device body and the second seal ring is disposed axially further from the external face of the device body than the first seal ring; and a seal collar being secured to the shaft and retaining with fluid tight the second seal ring;

wherein the attachment member includes an annular cooling groove formed to cover circumferentially over the seal face of the first seal ring fitting to the inner surface of the attachment member, wherein a cooling fluid passes through the annular cooling groove and cools the seal face;

a throttling face integral to the attachment member is disposed axially outward relative to the annular cooling groove; a throttling gap defined between the outer circumferential surface of the second seal ring and the throttling face, wherein the throttling gap is in open communication with an outer environment; and a diameter of the annular cooling groove is larger than a diameter of the throttling face; the attachment member also includes a coolant passage in communication with the annular cooling groove, wherein the coolant passage communicates with a drain port located under the cooling passage.

2. The mechanical seal as set forth in claim 1, wherein the annular cooling groove has such a size that one side face of the annular cooling groove is formed radially and outwardly at the axially inner midpoint of the first seal ring spaced from the seal face as a center and the other side face is formed radially and outwardly at the axially outer midpoint of the second seal ring.

3. The mechanical seal as set forth in claim 1, wherein the resilient means is located on the atmospheric airside, as compared to the seal face.

4. The mechanical seal as set forth in claim 1, wherein the gasket disposed between the attachment member and external face of the device body divides an internal space of the attachment member from an internal space of the device body.

5. The mechanical seal as set forth in claim 1, wherein the throttling face extends radially relative to a longitudinal axis of the shaft.

* * * * *